(12) United States Patent
Shen et al.

(10) Patent No.: US 10,267,890 B2
(45) Date of Patent: Apr. 23, 2019

(54) APPARATUS AND METHODS FOR TIME-LAPSE ASTROPHOTOGRAPHY

(71) Applicants: Dar-Tson Shen, West Vancouver (CA); Yan Liu, Surrey (CA); Su-Lin Liu, Vancouver (CA)

(72) Inventors: Dar-Tson Shen, West Vancouver (CA); Yan Liu, Surrey (CA); Su-Lin Liu, Vancouver (CA)

(73) Assignee: Nantong Schmidt Opto-Electrical Technology Co. Ltd., Rugao, Jiangsu (CN)

(*) Notice: Subject to any disclaimer, the term of this patent is extended or adjusted under 35 U.S.C. 154(b) by 617 days.

(21) Appl. No.: 14/315,884

(22) Filed: Jun. 26, 2014

(65) Prior Publication Data

US 2015/0377999 A1  Dec. 31, 2015

(51) Int. Cl.
| | |
|---|---|
| *H04N 5/265* | (2006.01) |
| *G01S 3/786* | (2006.01) |
| *H04N 5/225* | (2006.01) |
| *H04N 7/18* | (2006.01) |
| *H04N 1/21* | (2006.01) |
| *H04N 5/232* | (2006.01) |
| *H04N 5/235* | (2006.01) |

(52) U.S. Cl.
CPC ......... *G01S 3/7864* (2013.01); *H04N 1/2133* (2013.01); *H04N 5/2251* (2013.01); *H04N 5/232* (2013.01); *H04N 5/23203* (2013.01); *H04N 5/265* (2013.01); *H04N 7/183* (2013.01); *H04N 5/2355* (2013.01); *H04N 5/23264* (2013.01)

(58) Field of Classification Search
CPC .. G01S 3/7864; H04N 1/2133; H04N 5/2251; H04N 5/232; H04N 5/23203; H04N 5/23264; H04N 5/2355; H04N 5/265
See application file for complete search history.

(56) References Cited

U.S. PATENT DOCUMENTS

| 5,133,050 A | 7/1992 | George et al. |
|---|---|---|
| 5,365,269 A | 11/1994 | Holmes et al. |
| (Continued) | | |

FOREIGN PATENT DOCUMENTS

WO  2013085399  6/2013

OTHER PUBLICATIONS

"Patent Search Report", Cardinal IP, dated Mar. 26, 2014.
(Continued)

*Primary Examiner* — Md N Haque
(74) *Attorney, Agent, or Firm* — Todd A. Rattray; Oyen Wiggs Green & Mutala LLP (57) ABSTRACT

Apparatus and methods are provided for time-lapse astrophotography. One embodiment of the invention comprises a method for capturing a time-lapse image sequence. The method comprises capturing a first plurality of photographs, wherein capturing each photograph of the first plurality of photographs comprises opening a shutter of an image-capture device; while the shutter of the image-capture device is open, moving the image-capture device to reduce the movement of a celestial object or coordinate within the field of view of the image-capture device; closing the shutter of the image-capture device; and moving the image-capture device to a subsequent orientation.

17 Claims, 6 Drawing Sheets

(56) References Cited

U.S. PATENT DOCUMENTS

| | | | | |
|---|---|---|---|---|
| 6,044,228 | A * | 3/2000 | Hara | ................. G03B 5/00 |
| | | | | 396/246 |
| 6,304,376 | B1 | 10/2001 | Baun et al. | |
| 7,019,896 | B2 | 3/2006 | Denpo et al. | |
| 7,982,951 | B1 | 7/2011 | Innes et al. | |
| 8,514,489 | B2 | 8/2013 | Lopresti | |
| 8,515,270 | B1 | 8/2013 | Posehn | |
| 2004/0130618 | A1 * | 7/2004 | Kilian | ............. B60T 17/228 |
| | | | | 348/61 |
| 2009/0021606 | A1 * | 1/2009 | Kuruma | ............. H04N 5/361 |
| | | | | 348/231.99 |
| 2011/0285855 | A1 * | 11/2011 | Ota | ................. G01S 3/7864 |
| | | | | 348/169 |
| 2012/0056572 | A1 | 3/2012 | Bigler et al. | |
| 2012/0307356 | A1 | 12/2012 | Xu et al. | |
| 2013/0233996 | A1 | 9/2013 | Taylor et al. | |
| 2013/0265639 | A1 | 10/2013 | Batchvarov | |

OTHER PUBLICATIONS

"Astrophotography Basics", KODAK Customer Service Pamphlet, KODAK Publication No. AC-48, 2014, USA.
Instruction Manual, Orion StarShoot Deep Space Video Camera (DSVC), Orion Telescopes & Binoculars, 2011.
Radian, A motion time-lapse device for everyone, Alpine Laboratories, 2014.
Fotodiox, "Aputure Timer Camera Remote Control Shutter Cable IC", Amazon.com, 2014.

* cited by examiner

APPARATUS AND METHODS FOR TIME-LAPSE ASTROPHOTOGRAPHY

TECHNICAL FIELD

This invention relates to time-lapse photography. Particular aspects of this invention provide apparatus and methods for capturing time-lapse image sequences of celestial objects.

BACKGROUND

Apparatus and methods for time-lapse photography are known. In general, time-lapse photography comprises capturing a sequence of photographs or images at temporally spaced apart times (the time between the capture of subsequent images defining a frame capture rate), so that the captured images can be displayed at a playback rate that is faster than the frame capture rate. For example, a sequence of time-lapse images can be captured at a frame capture rate of 1 frame/second and played back at a playback rate of 30 frames/second. Using time-lapse photography, changes in a subject that take place over relatively long periods of time can be captured and played back in much shorter time periods, thereby animating the changes in the subject over time.

Celestial objects (e.g. stars) can be difficult to photograph, because many celestial objects are relatively dim. To obtain satisfactory exposure for a photograph of a celestial object, a relatively long exposure time may be used. However, celestial objects move relative to the earth and, consequently, photographing celestial objects with a relatively long exposure time results in blurring.

There is a general desire to provide techniques for capturing time-lapse images sequences of celestial objects.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

One aspect of the invention provides a method for capturing a time-lapse image sequence. The method comprises capturing a first plurality of photographs. Capturing each photograph of the first plurality of photographs comprises: opening a shutter of an image-capture device; while the shutter of the image-capture device is open, moving the image-capture device to reduce the movement of a celestial object or coordinate within the field of view of the image-capture device; closing the shutter of the image-capture device; and moving the image-capture device to a subsequent orientation.

Another aspect of the invention provides a method for capturing a time-lapse image sequence. The method comprises: providing a motorized mount that is controllably moveable, the motorized mount supporting an image-capture device; moving the mount to orient the image-capture device at an initial orientation; and repeating, for each of a plurality of photographs that make up the time-lapse image sequence: (a) opening a shutter of the image-capture device and, while the shutter is open during an exposure period, moving the mount and the image-capture device supported by the mount to compensate for the earth's rotation; (b) closing the shutter of the image-capture device at the end of the exposure period; and (c) moving the mount to orient the image-capture device at the initial orientation prior to a next photograph.

Another aspect of the invention provides a method for capturing a time-lapse image sequence. The method comprises: providing a motorized mount that is controllably moveable, the motorized mount supporting an image-capture device; moving the mount to orient the image-capture device at an initial orientation; and repeating, for each of a plurality of photographs that make up the time-lapse image sequence: (a) opening a shutter of the image-capture device and, while the shutter is open during an exposure period, moving the mount and the image-capture device supported by the mount to compensate for the earth's rotation; (b) closing the shutter of the image-capture device at the end of the exposure period; and (c) moving the mount to orient the image-capture device at a subsequent orientation prior to a next photograph.

Another aspect of this invention provides a computer program product. The computer program product comprises a non-transitory medium carrying a set of machine-readable instructions which, when executed by a processor of a mount for an image-capture device, cause the mount and an image-capture device supported by the mount to execute any of the methods described herein.

Another aspect of the invention provides a mount for an image-capture device comprising a processor configured to cause the mount and an image-capture device supported by the mount to perform any of the methods described herein.

In addition to the exemplary aspects and embodiments described above, further aspects and embodiments will become apparent by reference to the drawings and by study of the following description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1A:
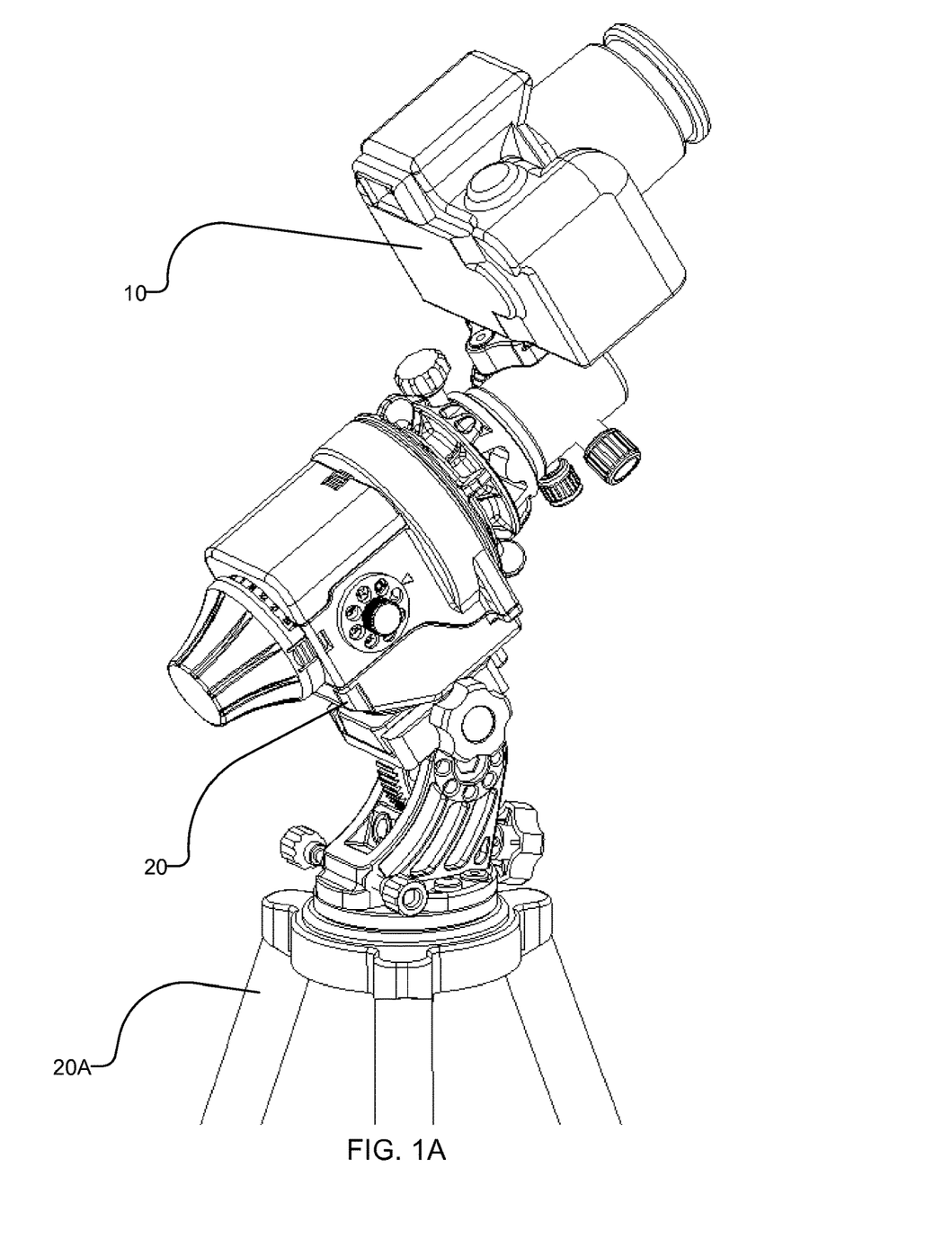
FIGS. 1A and 1B are respectively a perspective view and a schematic diagram of a mount for an image-capture device and an image-capture device supported by the mount for capturing time-lapse image sequences of celestial objects according to an example embodiment of the invention.
Figure 1B:
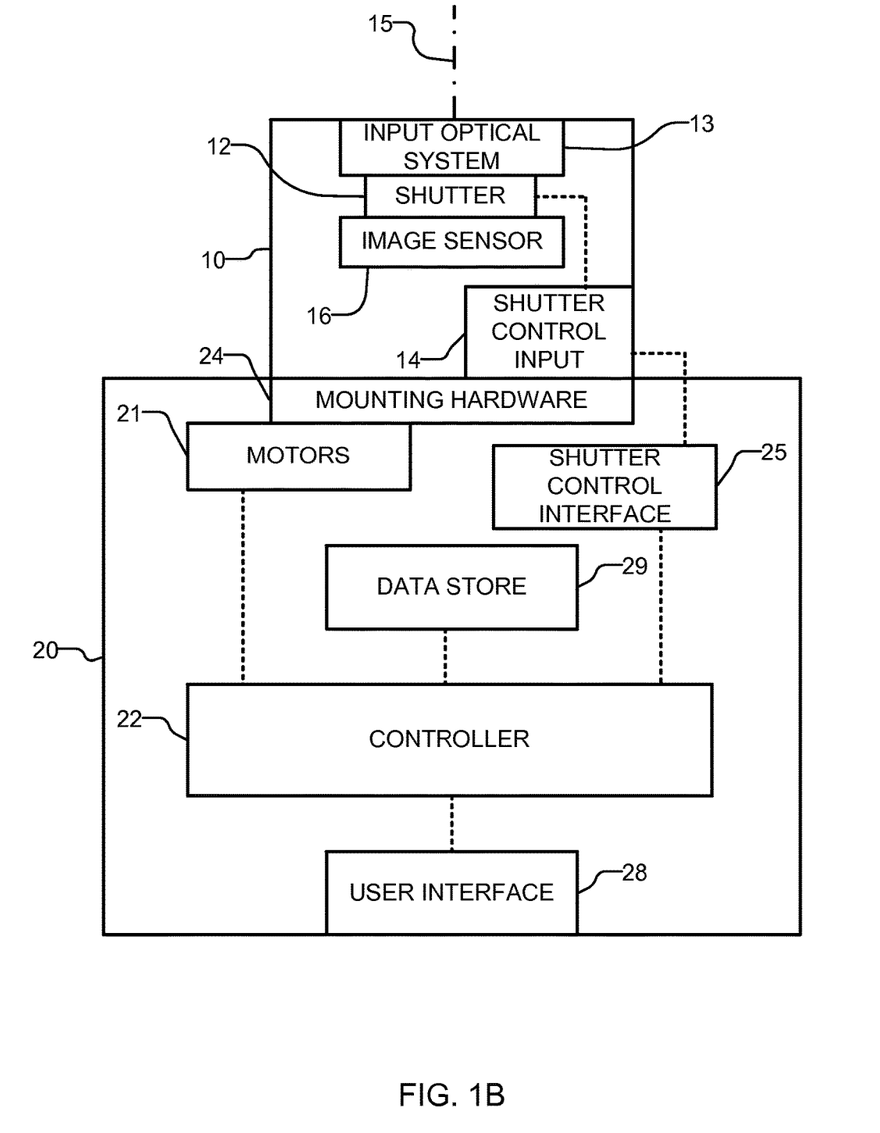

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIGS. 1A and 1B are respectively a perspective view and a schematic diagram of a mount 20 for an image-capture device and an image-capture device 10 (e.g. a camera) supported by mount 20 for capturing time-lapse image sequences of celestial objects according to an example embodiment. Image-capture device 10 comprises a shutter 12, an input optical system 13, a shutter-control input 14 and an image sensor 16. Image-capture device 10 may comprise a camera, a different type of device (e.g. a mobile phone, tablet device, laptop computer, telescope or other type of electronic or optical device) equipped with an image-capture device and/or the like. As is known in the art, image-capture device 10 may comprise a number of additional components. For brevity, such components are not shown in FIG. 1A or 1B, nor are they described in detail herein.

Image-capture device 10 captures images by receiving light on image sensor 16. When shutter 12 is open, light impinges on image sensor 16, through input optical system 13 which typically comprises one or more lenses, mirrors and/or other optical devices. When shutter 12 is closed, light is prevented from reaching image sensor 16. Image sensor 16 is sensitive to light and is capable of creating an image when light impinges thereupon. Shutter 12 may be used (at least in part) to control the amount of light that impinges on image sensor 16 by adjusting the exposure period or exposure time (i.e. the amount of time that shutter 12 remains open for capturing a particular image). Image-capture device 10 comprises a shutter-control input 14 which may be used to electronically control the operation of shutter 12, as explained in more detail below. Image-capture device 10 may be characterized by an optical axis 15. Optical axis 15 may be an imaginary line along which light propagates through input optical system 13 and/or image-capture device 10 and may characterize the orientation of image-capture device 10. Optical axis 15 may pass through a center of curvature of the lenses and/or mirrors in the input optical system 13 of image-capture device 10.

Mount 20 comprises an optional tripod 20A, mounting hardware 24 for connecting to and supporting an image-capture device 10, one or more motors 21 for adjusting the orientation of image-capture device 10 supported thereon and/or optical axis 15 of image-capture device 10, a shutter-control interface 25 for controlling shutter 12 of image-capture device 10 via shutter-control input 14 and a controller 22 for controlling motors 21 and shutter-control interface 25. As explained in more detail below, controller 22 may be configured to cause mount 20 and image-capture device 10 supported on mount 20 to capture time-lapse image sequences of celestial objects.

Figure 1C:
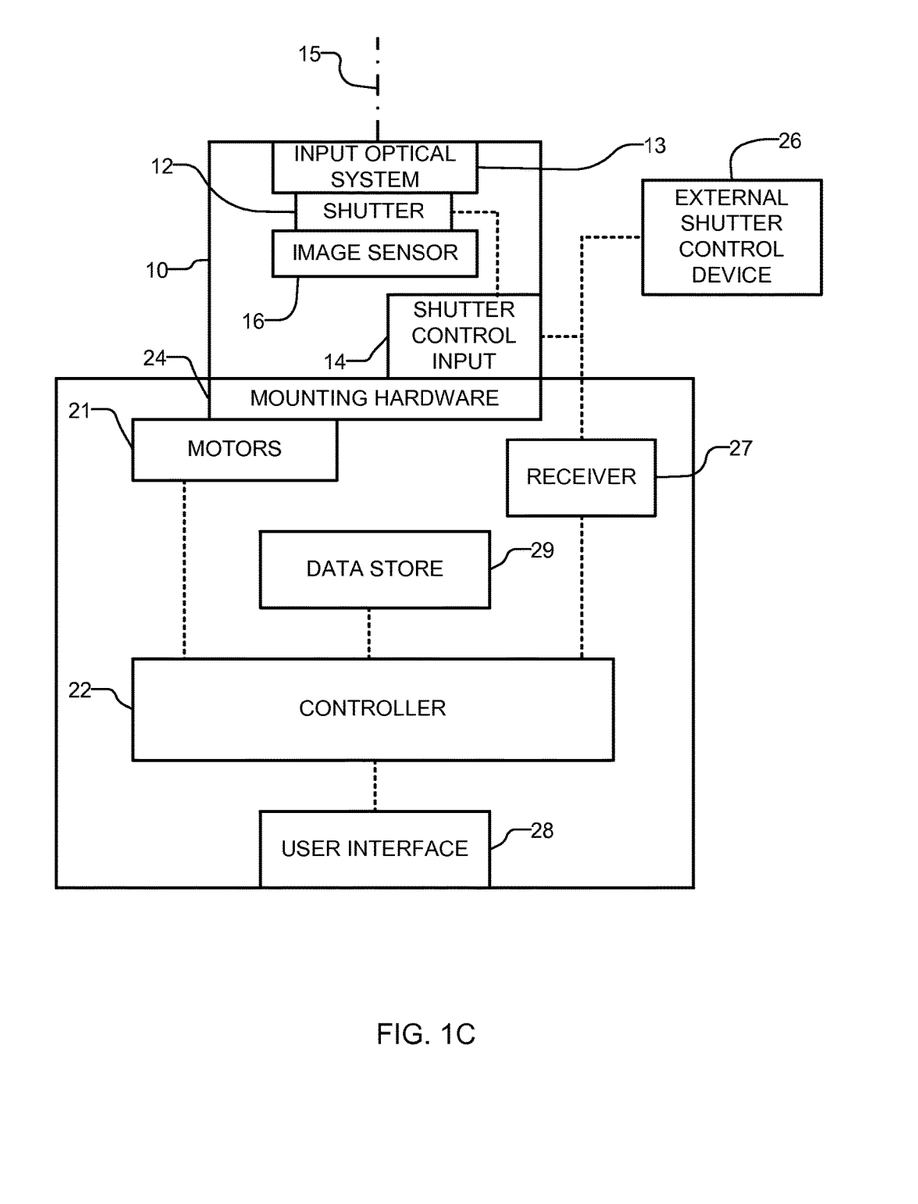
FIG. 1C is a schematic diagram of a mount for an image-capture device and an image-capture device supported by the mount for capturing time-lapse image sequences of celestial objects according to another example embodiment of the invention.

In another example embodiment illustrated in FIG. 1C, an external shutter control device 26 is provided. External shutter control device 26 may, but need not necessarily, be physically separate from image-capture device 10 and mount 20. External shutter control device 26 may comprise a relatively simple shutter control device 26 or may comprise a part of a relatively more sophisticated device (e.g. a remote control or computer-based controller) for controlling image-capture device 10. External shutter control device 26 may communicate shutter control information (e.g. by wired or wireless interface) to shutter control input 14. In some example embodiments, external shutter control device 26 may be operable to send "shutter-open" and "shutter-close" signals to shutter control input 14, thereby causing image capture device 10 to open and close shutter 12. Mount 20 may comprise a receiver 27 configured to receive such shutter control information (e.g. shutter-open and shutter-close signals) from external shutter control device 26 (for example, by a wired or wireless connection). As explained in more detail below, controller 22 may be configured to cause motors 21 to change the orientation of image-capture device 10 based on shutter-control information received from external shutter control device 26. For example, in some embodiments, when a shutter-open signal is received by receiver 27, controller 22 may be configured to cause motors 21 to change the orientation of image-capture device 10 (e.g. to track a celestial object and/or a celestial coordinate, as described in further detail below); and, when a shutter-closed signal is received by receiver 27, controller 22 may be configured to cause motors 21 to move the orientation of image-capture device 10 to its initial orientation or a subsequent orientation (as described in further detail below).

Controller 22 may cause image-capture device 10 to capture a plurality of photographs which, together, form a time-lapse image sequence. For each photograph in the plurality of photographs, controller 22 may control the shutter 12 of image-capture device 10 (via shutter-control interface 25 and shutter-control input 14) to open for a desired exposure period (e.g. a period of 1 to 180 seconds in some embodiments or 30 to 120 seconds in some embodiments). For each photograph, while the shutter of image-capture device 10 remains open during the exposure period, controller 22 may cause motors 21 of mount 20 to change the orientation of image-capture device 10 (e.g. to change the orientation of its optical axis 15). In particular, controller 22 may cause mount 10 to move image-capture device 10, such that the orientation of its optical axis 15 compensates for (or counteracts) the rotation of the earth relative to the celestial sphere.

Such movement of image-capture device 10 and/or its optical axis 15 to compensate for the rotation of the earth may be referred to as auto-tracking. When performed with sufficient precision, such auto-tracking movement of image-capture device 10 and/or its optical axis 15 can be used to cause a selected celestial object and/or celestial coordinate to remain substantially stationary within a field of view of image-capture device 10—i.e. can cause the optical axis 15 of image-capture device to "track" a celestial object and/or a corresponding celestial coordinate. When the optical axis 15 of image-capture device 10 is aligned with a particular celestial object, this auto-tracking movement of image-capture device 10 may reduce or eliminate the blurring effect that would otherwise be caused by movement of the particular celestial object within the field of view of image-capture device 10 during the exposure period. After each photograph is captured, controller 22 may cause motors 21 of mount 20 to move image-capture device 10 and/or its optical axis 15 back to their initial orientation prior to repeating the process for a subsequent photograph in the time-lapse image sequence. Image-capture device 10 may thereby capture a plurality of photographs which may be saved and played back as a time-lapse image sequence.

Controller 22 (and/or components thereof) may generally comprise hardware, software, firmware or any combination thereof. In the illustrated embodiment, controller 22 is implemented as an embedded controller comprising one or more processors and a suitable user interface 28, which may comprise user input apparatus, displays and/or the like (not shown). In some embodiments, controller 22 may be implemented on a programmed computer system comprising one or more processors and a user interface which may comprise user input apparatus, displays and/or the like. Processor(s) that embody controller 22 may comprise any suitable processor(s), such as by way of non-limiting example, microprocessors, digital signal processors, graphics processors, field programmable gate arrays, and/or the like. Components of controller 22 may be combined or subdivided, and components of controller 22 may comprise sub-components shared with other components of controller 22. Components of controller 22 may be physically remote from one another. In some embodiments, controller 22 is not necessarily a part of mount 20 and mount 20 may be controlled from a remote controller or the like.

As discussed above, motors 21 may be connected (or otherwise operable) to change the orientation of image-capture device 10 and/or its optical axis 15. In some embodiments, motors 21 may be connected (or otherwise operable) to pivot image-capture device 10 and/or its optical axis around one or more axes. Controller 22 may be configured to control the movement of motors 21 and to thereby control the movement of image-capture device 10 supported on mount 20 and/or its optical axis 15. For example, controller 22 may use feedback (e.g. from suitable sensor(s) (not shown), such as encoder(s) and/or the like, to control the movement of motors 21. Additionally or alternatively, motors 21 may comprise stepper motors which may be controlled without feedback sensors. Motor control circuits, their components and their operation are well known to those skilled in the art. For brevity, the details of such motor control circuits are not described further herein.

In some embodiments, mount 20 comprises an altitude-azimuth (or alt-az) mount 20. Motors 21 of an alt-az mount 20 are connected, and mount 20 is otherwise configured or configurable, to pivot image-capture device 10 and/or its optical axis 15 about a first azimuthal (or vertical) axis that is parallel to the direction of the force of the earth's gravity (i.e. extends between the center of the earth and the zenith) and a second altitude (or horizontal) axis that is parallel to the horizon and orthogonal to the azimuthal axis. It may be desirable to calibrate alt-az mount 20 such that its altitude and azimuthal axes are correctly oriented. Controller 22 may be configured to cause motors 21 of alt-az mount 20 to move image-capture device 10 and/or its optical axis 15 about both the altitude axis and the azimuthal axis to effect auto-tracking movement as discussed above.

In some embodiments, mount 20 comprises an equatorial mount 20. Motor(s) 21 of an equatorial mount 20 are connected, and mount 20 is otherwise configured or configurable, to pivot image-capture device 10 and/or its optical axis 15 about a first polar (or right ascension) axis that is parallel with the axis of rotation of the earth and a second declination axis that is orthogonal to the polar axis. It may be desirable to calibrate equatorial mount 20 such that its polar and declination axes are correctly oriented. This may be referred to as polar alignment. When mount 20 is so calibrated, controller 22 may be configured to cause one or more motors 21 (e.g. a right ascension motor) of equatorial mount 20 to effect auto-tracking movement by moving image-capture device 10 and/or its optical axis 15 about only the right ascension axis.

In the illustrated embodiment, mount 20 comprises a user interface 28 (e.g. a graphical, menu-driven and/or textual user interface). It is not necessary that user interface 28 be implemented solely on mount 20. In some embodiments, user input 28 comprises a wireless or a wired interface for communicating data to and from an external device (e.g. a laptop computer, a smartphone, a tablet device and/or the like) and the external device may provide a suitable user interface. User interface 28 may be used to communicate a variety of information and/or commands to mount 20 and/or from mount 20 to a user interacting with user interface 28. By way of non-limiting example, such information may include:

an initial orientation of image-capture device 10 and/or its optical axis 15. This initial orientation may be provided, for example, by specifying a particular celestial object (e.g. a star, etc.) or a particular celestial coordinate. Additionally or alternatively, this information may be provided by manipulating mount 20 (e.g. using suitable buttons (not shown) on user interface 28) such that the particular celestial object or particular celestial coordinate is in the center of the field of view and then indicating (e.g. pressing another suitable button on user interface 28) that the current location is to be the initial orientation;

the location of mount 20 on the earth's surface, the date, and the time. In some embodiments, mount 20 may be able to obtain this information directly from a global positioning system unit, a calendar, and a clock;

a particular celestial object or celestial coordinate to be tracked;

image data obtained by image-capture device 10;

an exposure time for a "long exposure" photograph (see explanation below);

an exposure time for a "short exposure" photograph (see explanation below);

a number of photographs to capture in a time-lapse image sequence;

an amount of time to wait between photographs;

an exposure period of each photograph;

a final orientation of image-capture device 10 (in the case of a moving-perspective time-lapse image sequence);

a trajectory of image-capture device 10 between an initial orientation and a final orientation (in the case of moving-perspective time-lapse photography);

data, operational instructions and/or the like which may be stored in data store 29; and/or the like.

Mount 20 may comprise a data store 29. Data store 29 may contain machine-executable instructions and/or data. Controller 22 may be configured to retrieve and execute machine-executable instructions and to write data to and/or read data from data store 29.

Data store 29 may contain or may be programmed to contain a variety of machine-executable instructions and/or data including, without limitation:

formulae and/or algorithms for converting between different types of coordinate systems;

the celestial coordinates of various celestial objects;

machine-executable instructions for controlling motors 21 to change the orientation of image-capture device 10 (e.g. to track a particular celestial object or coordinate);

machine-executable instructions for using shutter-control interface 25 to control shutter 12 of image-capture device 10 via shutter-control input 14; and/or the like.

Figure 2:
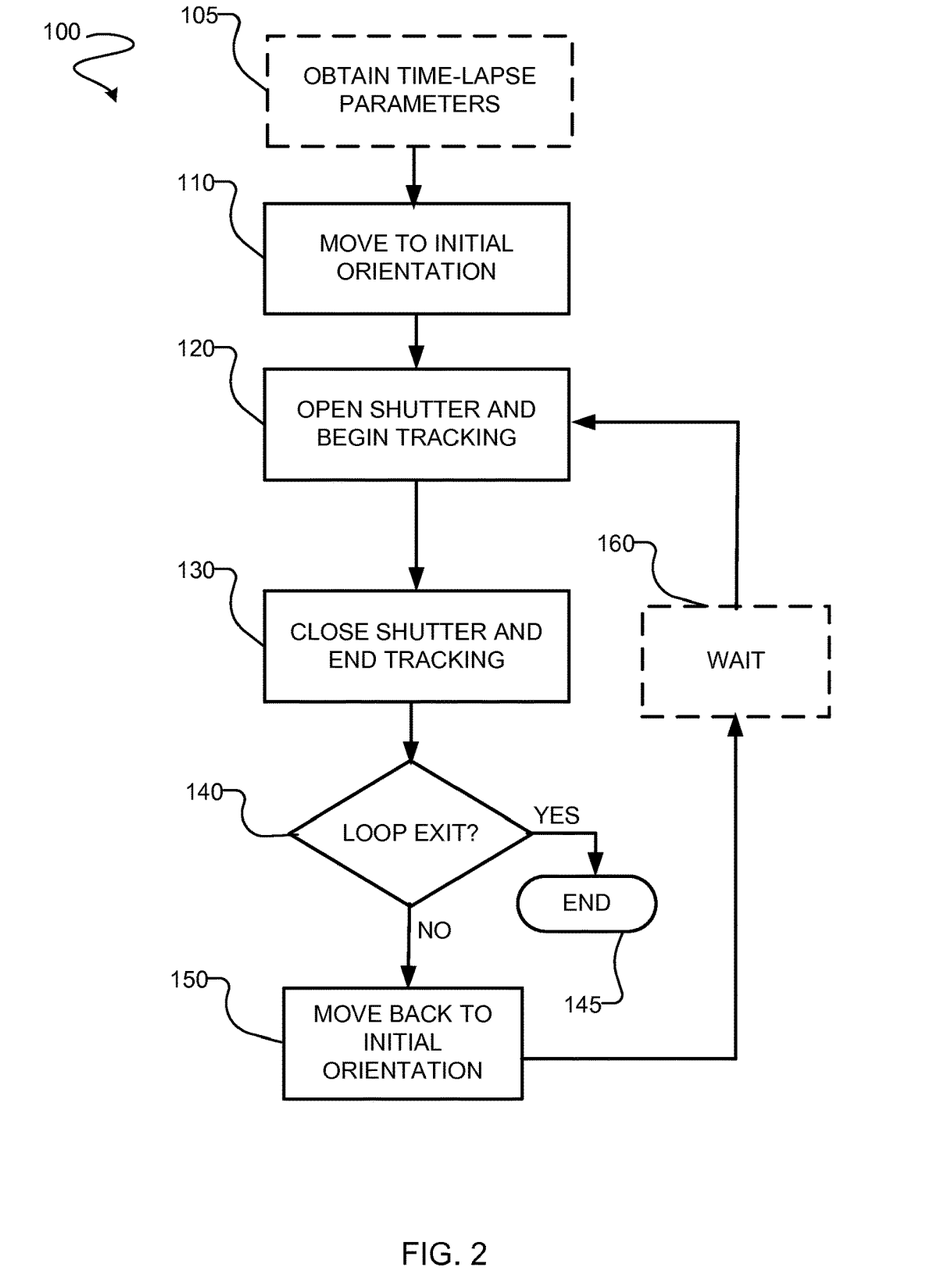
FIG. 2 is a schematic diagram of a method for capturing time-lapse image sequences of celestial objects according to an example embodiment of the invention.

FIG. 2 is a schematic depiction of a method 100 for capturing a time-lapse image sequence according to a particular embodiment. Method 100 may be performed, at least in part, by controller 22 which may use mount 20 and image-capture device 10 supported by mount 20 to effect method 100. For the purpose of explaining method 100, this description assumes that mount 20 and image-capture device 10 are suitably calibrated for auto-tracking, as is known in the art.

Method 100 commences in optional block 105 which involves obtaining one or more parameters associated with the time-lapse image sequence to be procured. Such parameters may be entered by a user via user interface 28, for example. Such parameters may include, by way of non-limiting example: the exposure period for each photograph in the time-lapse image sequence; the interval between successive photographs (i.e. the image-acquisition period) in the time-lapse image-sequence; the total duration of the time-lapse image sequence; the number of photographs in the time-lapse image sequence; an initial orientation for each photograph in the time-lapse image sequence and/or the like. Block 105 is not required. In some cases, one or more default parameters may be used, in which case such default parameters may be used in the place of user-input parameters. In some embodiments, as discussed in more detail below, the initial orientation for each photograph may be obtained in block 110.

Method 100 then proceeds to block 110 which involves moving image-capture device 10 and/it optical axis 15 to an initial orientation. Block 110 may comprise moving image-capture device 10 to its initial orientation using motor(s) 21. In some embodiments, block 110 may be performed in part by a user. For example, as part of block 110, a user may interact with user interface 28 to cause motor(s) 21 to move image-capture device 10 to an initial orientation and may then interact with user interface 28 to set the current location to be the initial orientation. In some embodiments, block 110 may be performed by controller 22 which may use motor(s) 21 to controllably move image-capture device 10 to an initial orientation wherein the initial orientation may be obtained by controller 22 from a user (via user interface 28) as a part of block 110 or as one of the block 105 parameters. In some embodiments, the block 110 initial orientation may be specified in terms of a celestial object, a particular set of celestial coordinates (e.g. the celestial coordinates of a celestial object) and/or the like. For example, mount 20 may comprise a so-called GO-TO mount 20, where a user may select a celestial object or celestial coordinate (e.g. via user interface 28) and mount 20 may controllably move image-capture device 10 so that its optical axis 15 is oriented toward the selected celestial object or celestial coordinate and/or so that the selected celestial object or celestial coordinate is located (e.g. generally centered) within the field of view of image-capture device 10.

Method 100 then proceeds to block 120, which involves opening shutter 12 of image-capture device 10. Mount 20 may cause shutter 12 of image-capture device 10 to open by sending appropriate command(s) and/or signal(s) to shutter-control input 14 via shutter-control interface 25. Block 120 involves maintaining shutter 12 in its open configuration for an exposure period. As discussed above, the exposure period may be one of the block 105 time-lapse parameters. In some embodiments, shutter 12 stays open as long as appropriate command(s) and/or signal(s) are received at shutter-control input 14. In some embodiments, the command(s) and/or signal(s) provided to shutter-control input 14 via shutter-control interface 25 are toggle-type commands, which toggle shutter 12 between open and/or closed configurations. In some embodiments, a user may configure image-capture device 10 (e.g. a controller (not shown) of image-capture device 10) with an exposure period via a suitable user interface (not shown) on image-capture device 10. In some embodiments, mount 20 may communicate the exposure period to image-capture device 10 via shutter-control interface 25 and shutter-control input 14. Where image-capture device 10 is provided with the exposure period, mount 20 may only send a single command/signal (or a single sequence of commands/signals) to image capture device 10 (via shutter-control interface 25 and shutter-control input 14), which causes image-capture device 10 to open its shutter 12 for the desired exposure period. This is not necessary. In some embodiments, mount 20 (e.g. controller 22) controls the exposure period independently of image-capture device 10 by sending appropriate signal(s) and/or command(s) (via shutter-control interface 25 and shutter-control input 14) to open shutter 12 and to subsequently close shutter 12 (see block 130 below). Controller 22 of mount 20 may use the exposure period to determine how long to track the selected celestial object or coordinate (see below).

Also in block 120, while shutter 12 is open, controller 22 causes motor(s) 21 of mount 20 to controllably move (e.g. change the orientation of) image-capture device 10 and/or its optical axis 15 in an auto-tracking manner—e.g. to track a celestial object or celestial coordinate so that the celestial object or celestial coordinate remains substantially stationary within the field of view of image-capture device 10. The celestial object or celestial coordinate which is auto-tracked while shutter 12 is open in block 120 may be selected by a user via user input 28 (e.g. as part of blocks 105 or 110 discussed above). The celestial object or celestial coordinate which is auto-tracked while shutter 12 is open in block 120 may be the celestial object or celestial coordinate that is at the center of the field of view (or at some other position within the field of view) of image-capture device 10 when image-capture device 10 is in its block 110 initial orientation.

In some embodiments, the auto-tracking movement effected by mount 20 while shutter 12 is open in block 120 does not keep the celestial object or celestial coordinate completely stationary within the field of view of image-capture device 10, but rather reduces the movement of the celestial object or celestial coordinate within the field of view of image-capture device 10 or minimizes the movement of the celestial object or celestial coordinate within the field of view of image-capture device 10 to an acceptable level. This "imperfect" auto-tracking may reduce to an acceptable level, but may not completely eliminate, the blurring effect caused by movement of the celestial object within the field of view of image-capture device 10 while shutter 12 remains open.

To effect the block 120 movement, mount 20 may cause image-capture device 10 and/or its optical axis 15 to controllably pivot around one or more axes. In some embodiments, mount 20 may pivot image-capture device 10 and/or its optical axis 15 around only a single axis while shutter 12 is open in block 120. For example, where mount 20 is an equatorial mount, the block 120 auto-tracking movement may be effected by controller 22 causing motor(s) 21 to pivot image capture device 10 and/or its optical axis 15 about only the polar (e.g. right ascension) axis. In some embodiments, mount 20 may pivot image-capture device 10 and/or its optical axis 15 around a plurality of axes while shutter 12 is open in block 120. For example, where mount 20 is an altitude-azimuthal mount, the block 120 auto-tracking movement may be effected by controller 22 causing motor(s) 21 to pivot image-capture device 10 and/or its optical axis 15 about the altitude axis and the azimuthal axis. In some embodiments, where mount 10 is an altitude-azimuthal mount, a mechanical/optical field de-rotator may be used to correct for field rotation that occurs with alt-az mounts. In some embodiments, where mount 10 is an altitude-azimuthal mount, field de-rotation software may be used to correct for field rotation.

In some embodiments and/or circumstances (e.g. where the motion of a particular celestial object (e.g. a planet) exhibits motion other than diurnal motion), controller 22 may determine (e.g. calculate or look-up) how motor(s) 21 should move image-capture device 10 and/or its optical axis 15 in block 120 to maintain the celestial object or celestial coordinate substantially stationary within the field of view of image-capture device 10. Controller 22 may access information regarding the trajectories of various celestial objects and/or coordinates from a data store (e.g. data store 29) which may in turn receive such information via user interface 28.

In some embodiments and/or circumstances, controller 22 causes mount 20 and image-capture device 10 supported thereon to track the celestial object in "real-time" by monitoring captured image data to determine a location of a celestial object in the field of view of image-capture device 10 (e.g. in the captured image data) and adjusting the orientation of image-capture device 10 so that the celestial object remains approximately stationary within the field of view of image-capture device 10.

At the end of the exposure period, method 100 proceeds from block 120 to block 130, which comprises closing shutter 12 of image-capture device 10. As discussed above, in some embodiments, image-capture device 10 closes shutter 12 automatically after a configurable exposure period. For example, image-capture device 10 may be configured, using a suitable user interface (not shown), to close shutter 12 after a user-configurable exposure period or image-capture device 10 may be configured by mount 20 (via shutter-control interface 25 and shutter-control input 14) to close shutter 12 after a user-configurable exposure period. In some embodiments, mount 20 controls the exposure period independently of image-capture device 10 and communicates appropriate signal(s) and/or command(s) to close shutter 12 in block 130 via shutter-control interface 25 and shutter-control input 14. Also in block 130, mount 20 stops tracking the celestial object or celestial coordinate.

In particular embodiments, tracking of the celestial object or celestial coordinate in block 120 may take place during at least 25%, 50%, 75%, 95%, 99%, or 100% of the time during which shutter 12 remains open in block 120. In some embodiments, tracking begins shortly before shutter 12 opens in block 120 and ends shortly after shutter 12 closes in block 130.

In some embodiments, shutter 12 may remain open for 1, 5, 10, 30, 60, 120, or 180 seconds.

Once shutter 12 is closed in block 130, method 100 proceeds to block 140, which involves evaluating a loop exit criteria to determine whether the current photograph is the last photograph in the time-lapse image sequence. By way of non-limiting example, the block 140 loop exit criteria may comprise evaluating whether a desired number of photographs has been captured for the time-lapse image sequence, whether a desired total duration of the time-lapse image sequence has been reached and/or the like. The block 140 loop exit criteria may be configured as one of the block 105 time-lapse parameters. If the block 140 inquiry determines that the time-lapse image sequence should end (block 140 YES branch), then method 100 terminates in block 145.

If, on the other hand, the block 140 inquiry determines that another photograph should be captured (block 140 NO branch), then method 100 proceeds to block 150, where mount 20 moves image-capture device 10 and/or its optical axis 15 back to the block 110 initial orientation (e.g. controller 22 causes motor(s) 21 to move image-capture device 10 back to the block 110 initial configuration). From block 150, method 100 proceeds to optional block 160, where image-capture device 10 and mount 20 wait for the commencement of the next image-acquisition period before proceeding to block 120 and repeating the image-capture process. It will be appreciated that the image-acquisition period (i.e. the time between the start of successive photographs in a time-lapse image sequence) is not the same as the exposure period (the time during which shutter 12 is open during a particular photograph). In general, the image-acquisition period is greater than the exposure period. In some embodiments, the image-acquisition period may be, for example, 15, 30, 60, 120, or 300 seconds. After the block 160 wait, method 100 proceeds to block 120 and repeats the image-capture process by opening shutter 12 and effecting movement of image-capture device 10, as discussed above.

In some embodiments, the order of two or more of blocks 140, 150 and 160 may be interchanged.

As discussed above, in a typical application of method 100 the image acquisition process of blocks 120 and 130 may be repeated a number N times to capture a corresponding number N photographs and to form a time-lapse image sequence comprising N images. The number N may be a block 105 time-lapse parameter. The number N may be derived from other parameters (e.g. other block 105 time-lapse parameters) such as the total time of the time-lapse image sequence divided by the image-acquisition period. In some embodiments, N may be 50, 100, 300, 500, 1000, or 5000. These N photographs capture in method 100 may be saved (e.g. in data store 29) and played back as a time-lapse image sequence.

Figure 3:
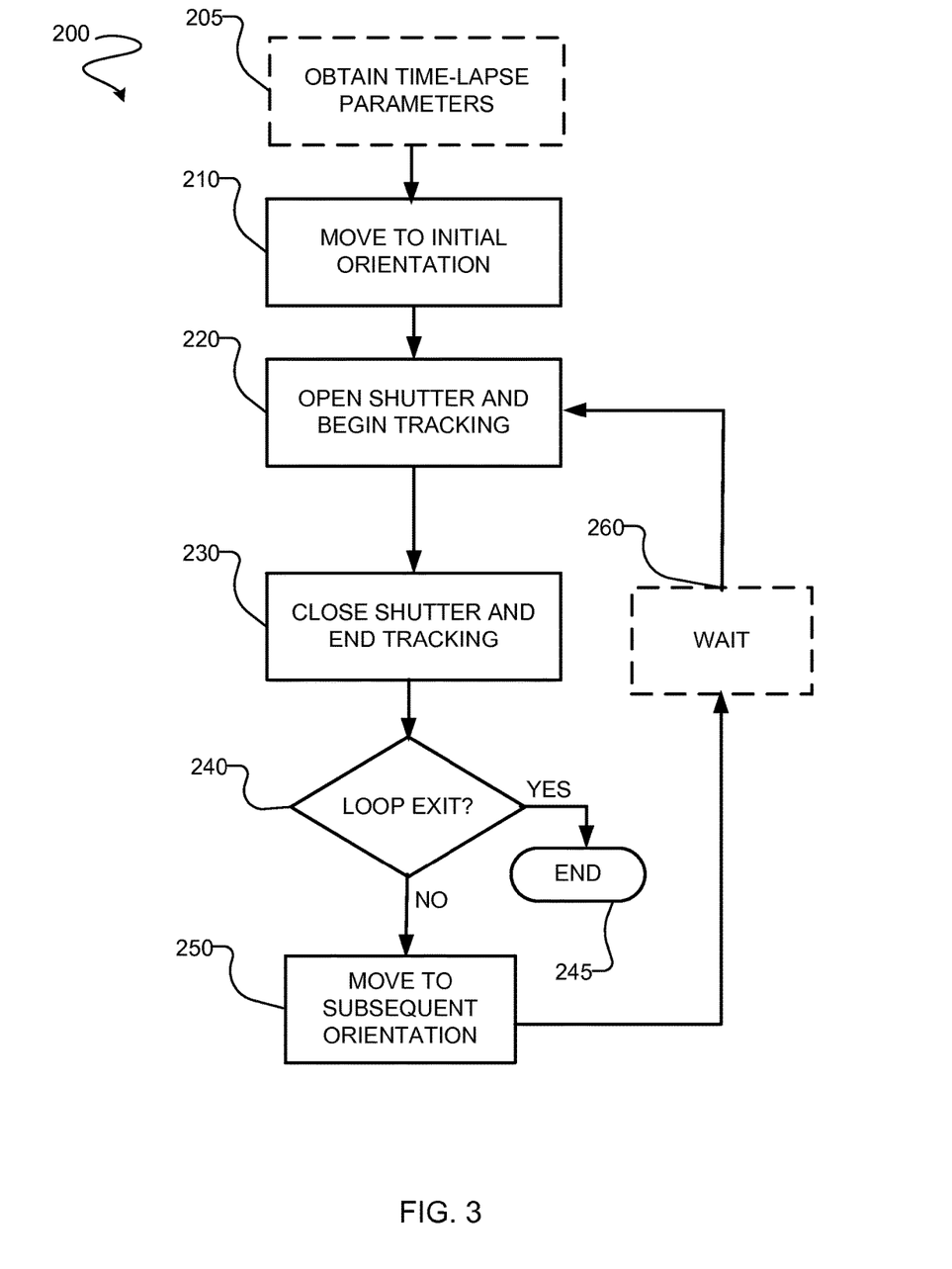
FIG. 3 is a schematic diagram of a method for capturing "moving-perspective" time-lapse image sequences of celestial objects according to an example embodiment of the invention.

FIG. 3 is a schematic depiction of a method 200 for capturing a "moving perspective" time-lapse image sequence according to a particular embodiment. Method 200 may be performed, at least in part, by controller 22 which may use mount 20 and image-capture device 10 supported by mount 20 to effect method 200. In method 200, the procedures involved in blocks 210, 220, 230, 240, 245 and 260 may be analogous or substantially similar to the procedures of blocks 110, 120, 130, 140, 145 and 160 of method 100, respectively. Optional step 205 may differ from step 105 in that optional step 205 may include providing a moving perspective trajectory or perspective path, which may comprise or otherwise define a number of orientations for image-capture device 10 and/or its optical axis 15.

Block 240 of method 200 differs from block 140 of method 100 in that in block 240, image-capture device 10 is moved to a next or subsequent orientation along a perspective path. In some embodiments, the block 210 initial orientation and a set of one or more block 250 subsequent orientations of image-capture device 10 and/or its optical axis 15 may define or characterize a perspective path. In other embodiments, the perspective path may define the block 210 initial orientation and the set of one or more block 250 subsequent orientations. The perspective path and/or the block 210, 250 orientations may be selected by a user via user input 28 (e.g. as part of the block 205 time-lapse parameters as discussed above). The perspective path may be the shortest path between an initial orientation and a final orientation (e.g. a "straight-line" path), or a shaped path between an initial orientation and a final orientation (e.g. a "curved" path that follows a sinusoidal, parabolic path, or polynomial path; a "piecewise linear" path; and/or the like). The blocks 210, 250 orientations may be equally-spaced along the perspective path.

Figure 4:
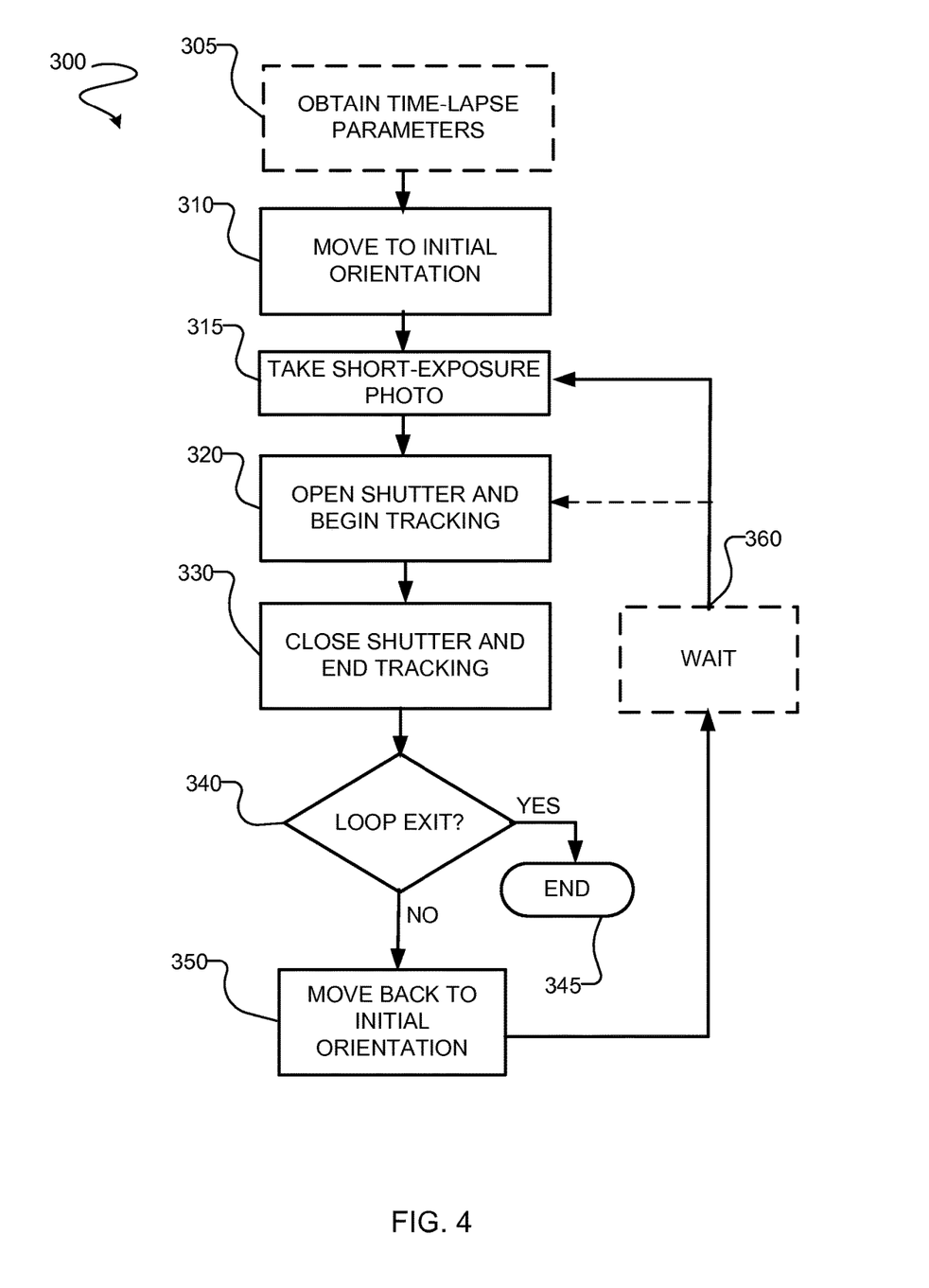
FIG. 4 is a schematic diagram of a method for capturing "multiple-exposure" time-lapse image sequences of celestial objects according to an example embodiment of the invention.

FIG. 4 is a schematic depiction of a method 300 for capturing a "multiple-exposure" time-lapse image sequence according to a particular embodiment. Method 300 may be performed, at least in part, by controller 22 which may use mount 20 and image-capture device 10 supported by mount 20 to effect method 300. In method 300, the procedures involved in blocks 310, 320, 330, 340, 345, 350 and 360 may be analogous or substantially similar to the procedures of blocks 110, 120, 130, 140, 145, 150 and 160 of method 100, respectively. Optional step 305 may differ from step 105 in that optional step 305 may include providing a short exposure period for a short-exposure photograph which may be used in block 315, as explained in more detail below.

Sometimes not all objects in the field of view of image-capture device 10 will move with the same trajectory. By way of non-limiting example, the field of view of image-capture device 10 may contain: stars which may move relative to image-capture device 10 with a first (diurnal) trajectory; a planet (or comet) which moves relative to image-capture device 10 with a second (non-diurnal) trajectory; and a mountain (which does not move relative to image-capture device 10). Method 300 may attempt to compensate for this effect.

In block 315, a short-exposure photograph is captured. In some embodiments, controller 22 may cause image-capture device 10 to capture a short-exposure photograph in block 315 by suitably opening and closing shutter 12 using appropriate signal(s) and/or command(s) communicated via shutter-control interface 25 and shutter-control input 14. The short-exposure photograph may have a short-exposure period that is less than the exposure period of the photographs captured in blocks 320-330 (the "long-exposure photographs"). In some embodiments, the user may configure the block 315 short-exposure period as part of block 305, as discussed above. In some embodiments, a user may configure the short-exposure period via a user interface (not shown) of image-capture device 10. In some embodiments, the user may configure the short-exposure period via user input 28 of mount 20. In some embodiments, a plurality of different short-exposure periods may be used in a corresponding plurality of iterations of block 315. In some embodiments, the short-exposure photograph may have a short-exposure period that is $1/1000$, $1/500$, $1/250$, $1/125$, $1/60$, $1/30$, $1/15$, $1/8$, $1/4$, $1/2$, or 1 second.

In the illustrated FIG. 4 embodiment, the block 315 short-exposure photograph is captured in each iteration of the method 300 loop (e.g. in each iteration of blocks 315-360). As mentioned above, the block 315 short-exposure photographs may not all have the same short-exposure periods. In some embodiments, image-capture device 10 or mount 20 comprises a light meter (not shown) or otherwise receives data from a light meter, and the short-exposure period of each block 315 short-exposure photograph is selected based on a reading of the light meter.

In some optional embodiments (shown in the dotted line in FIG. 4), the block 315 short-exposure photograph need not be captured in each loop of method 300. For example, in some embodiments, only a block 315 single short-exposure photograph is captured in a first iteration of the method 300 loop, after which method 300 loops to block 320. In some embodiments, block 315 short-exposure photographs 315 may be captured once for every several (e.g. once for every 2 or 3) iterations of the method 300 loop.

Each of the block 320 long-exposure photographs may be combined with a corresponding block 315 short-exposure photograph to create a corresponding composite photograph. As discussed above, there may be a one-to-one correspondence between long-exposure photographs and short-exposure photographs or pluralities of long-exposure photographs may be associated with a corresponding short-exposure photograph in a many-to-one correspondence. The plurality of composite photographs may then form the time-lapse image sequence generated by method 300 and may be saved or played back as a multiple-exposure time-lapse image sequence.

Each pair of long-exposure and short-exposure photographs may be combined in any suitable way. For example, photo editing software may be used to create a composite photograph which includes the long-exposure image of the stars and the short-exposure image of the planet and the mountain. In some embodiments, photo editing software may be used to create a composite photograph which includes the long exposure image of celestial objects (e.g. stars, etc.) and the short exposure image of terrestrial objects (e.g. landscapes, trees, mountains, oceans, etc.).

The invention may also be provided in the form of a program product. The program product may comprise any medium which carries a set of computer-executable signals comprising instructions which, when executed by a mount (e.g. mount 20), cause the mount to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a controller, microprocessor, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments are discussed herein, those of skill in the art will recognize certain modifications, permutations, additions and sub-combinations thereof. For example:
- the apparatus and methods described herein are not limited to time-lapse image sequences of celestial objects; non-celestial objects may also be tracked.
- in some embodiments, shutter-control interface 25 of the FIG. 1B mount 20 may comprise a shutter actuator which may physically actuate shutter 12 of image-capture device 10. Other than for physically actuating shutter 12, such a shutter actuator may function in a manner similar to that of shutter-control interface 25 described herein.
- In the above described embodiment of FIG. 1C, receiver 27 is described as receiving shutter-control information from external shutter control device 26. In some embodiments, receiver 27 may receive similar information about when shutter 12 opens and/or closes from image-capture device 10. For example, shutter control input 14 of image-capture device 10 and receiver 27 may comprise two-way communications interfaces for communication of such information.

It is therefore intended that the following appended claims and claims hereafter introduced are interpreted to include all such modifications, permutations, additions and sub-combinations as are within their true spirit and scope.

What is claimed is:

1. A method for operating an image-capture device to capture a time-lapse image sequence, the method comprising:
   capturing a first plurality of photographs with the image capture device, wherein capturing each photograph of the first plurality of photographs comprises:
   opening a shutter of the image-capture device;
   while the shutter of the image-capture device is open, moving the image-capture device to reduce movement of a celestial object or celestial coordinate within a field of view of the image-capture device; closing the shutter of the image-capture device; and
   while the shutter of the image-capture device is closed, moving the image-capture device to a subsequent orientation for capturing a next photograph;
   wherein the subsequent orientation is the same for each photograph of the first plurality of photographs; and wherein moving the image-capture device to reduce movement of the celestial object or celestial coordinate within the field of view of the image-capture device comprises moving the image-capture device to keep the celestial object or coordinate substantially stationary within the field of view of the image-capture device; and wherein moving the image-capture device to reduce movement of the celestial object or celestial coordinate within the field of view of the image-capture device comprises changing an orientation of an optical axis of the image-capture device to track relative movement between the earth and the celestial object or celestial coordinate.

2. A method according to claim 1 wherein moving the image-capture device to reduce movement of the celestial object or celestial coordinate within the field of view of the image-capture device comprises changing an orientation of an optical axis of the image-capture device to track relative movement between the earth and the celestial sphere.

3. A method according to claim 1 wherein moving the image-capture device to reduce movement of the celestial object or celestial coordinate within the field of view of the image-capture device comprises changing an orientation of an optical axis of the image-capture device to auto-track the celestial object or celestial coordinate.

4. A method according to claim 1 comprising moving the image-capture device to an initial orientation prior to capturing a first one of the first plurality of photographs and wherein, for each photograph of the first plurality of photographs, moving the image-capture device to the subsequent orientation comprises moving the image-capture device to the initial orientation.

5. A method according to claim 1 comprising capturing a short-exposure photograph, wherein the short-exposure photograph has a shorter exposure period than an exposure period of at least one photograph of the first plurality of photographs.

6. A method according to claim 5 comprising holding the image-capture device stationary while capturing the short-exposure photograph.

7. A method according to claim 5 comprising selecting the exposure period of the short exposure photograph based on a reading of a light meter.

8. A method according to claim 5 comprising combining the short-exposure photograph with at least one photograph of the first plurality of photographs to thereby provide at least one composite photograph.

9. A method according to claim 8 wherein combining the short-exposure photograph with the at least one photograph of the first plurality of photographs comprises combining an image of a terrestrial object from the short-exposure photograph with an image of a celestial object from the at least one photograph of the first plurality of photographs.

10. A method according to claim 1 comprising capturing a second plurality of photographs corresponding to the first plurality of photographs using the image-capture device, wherein:
    each photograph of the second plurality of photographs is captured by the image-capture device immediately before or after its corresponding photograph of the first plurality of photographs;
    each photograph of the second plurality of photographs has an exposure period that is shorter than the exposure period of its corresponding photograph of the first plurality of photographs.

11. A method according to claim 10 comprising combining each photograph of the second plurality of photographs with its corresponding photograph of the first plurality of photographs to provide a third plurality of composite photographs.

12. A method according to claim 1 wherein capturing each photograph of the first plurality of photographs comprises waiting for a conclusion of an image-acquisition period prior to capturing a subsequent one of the first plurality of photographs.

13. A method according to claim 12 wherein the wait period is at least five seconds.

14. A computer program product comprising a non-transitory medium carrying a set of machine-readable instructions which, when executed by a processor of a mount for an image-capture device, cause the mount and an image-capture device supported by the mount to execute the method of claim 1.

15. A mount for an image-capture device comprising a processor configured to cause the mount and an image-capture device supported by the mount to perform the method of claim 1.

16. A method for operating an image-capture device to capture a time-lapse image sequence, the method comprising:
    providing a motorized mount that is controllably moveable, the motorized mount supporting the image-capture device;
    moving the mount to orient the image-capture device at an initial orientation;
    repeating, for each of a plurality of photographs that make up the time-lapse image sequence:
    opening a shutter of the image-capture device and, while the shutter is open during an exposure period, moving the mount and the image-capture device supported by the mount to compensate for the earth's rotation; closing the shutter of the image-capture device at the end of the exposure period; and
    while the shutter of the image-capture device is closed, moving the mount to orient the image-capture device at the initial orientation prior to a next photograph;
    wherein moving the mount and the image-capture device supported by the mount to compensate for the earth's rotation comprises moving the image-capture device to keep a celestial object or coordinate substantially stationary within the field of view of the image-capture device; and wherein moving the image-capture device to reduce movement of the celestial object or celestial coordinate within the field of view of the image-capture device comprises changing an orientation of an optical axis of the image-capture device to track relative movement between the earth and the celestial object or celestial coordinate.

17. A method according to claim 1, wherein moving the image-capture device comprises moving a mount, to which the image-capture device is mounted, on a plurality of movement axes, to thereby move the image-capture device.

* * * * *